United States Patent [19]

Gauthier et al.

[11] Patent Number: 4,793,372
[45] Date of Patent: Dec. 27, 1988

[54] ELECTRONIC VACUUM REGULATOR (EVR) WITH BI-METALLIC ARMATURE DISK TEMPERATURE COMPENSATOR

[75] Inventors: Michel D. Gauthier; Albert J. Carmanico, both of Chatham, Canada

[73] Assignee: Bendix Electronics Limited, Chatham, Canada

[21] Appl. No.: 115,011

[22] Filed: Oct. 29, 1987

[51] Int. Cl.$^4$ .............................................. F16K 31/06
[52] U.S. Cl. .................................... 137/82; 137/80; 137/468; 137/907; 251/129.08; 251/129.16; 251/129.21; 335/217
[58] Field of Search ............... 137/80, 82, 468, 907; 251/129.08, 129.16, 129.21; 335/217, 218

[56] References Cited

U.S. PATENT DOCUMENTS

| | | | |
|---|---|---|---|
| 4,522,371 | 6/1985 | Fox et al. | 251/129.21 |
| 4,524,948 | 6/1985 | Hall | 251/129.21 |
| 4,534,375 | 8/1985 | Fox | 137/82 |
| 4,567,910 | 2/1986 | Slavin et al. | 137/82 |
| 4,610,428 | 9/1986 | Fox | 251/129.16 |
| 4,628,887 | 12/1986 | Mitchell et al. | 137/907 X |
| 4,705,059 | 11/1987 | Lecerf et al. | 137/82 |

FOREIGN PATENT DOCUMENTS 124399  11/1984  European Pat. Off. ....... 251/129.16

Primary Examiner—Gerald A. Michalsky
Attorney, Agent, or Firm—Markell Seitzman; Russel C. Wells

[57] ABSTRACT

A solenoid valve comprising: a stator; a coil responsive to current into thereto, and magnetically connected to the stator. The coil characterized such that its resistance changes with temperature to increase or decrease, as the case may be to vary the amount of flux generated. A valve seat positioned about one end of the stator defining a valve seating surface positioned at a predetermined distance for the one end and a flat armature movable relative to the valve seat and when seated thereon is spaced from the one end. The armature fabricated of a bi-metallic, thermally responsive element for causing a portion of such armature to move closer to or farther from the stator to vary the distance between such portion on the one end as a function of temperature to compensate for the changes in magnetic flux.

23 Claims, 1 Drawing Sheet

ELECTRONIC VACUUM REGULATOR (EVR) WITH BI-METALLIC ARMATURE DISK TEMPERATURE COMPENSATOR

BACKGROUND AND SUMMARY OF THE INVENTION

The present invention relates generally to solenoid valves and more particularly to an electric vacuum regulator valve employing means for compensating for variations in magnetic force due to the change of resistivity of a coil.

Characteristic of all electromagnetic valves is a coil which upon energization develops magnetic flux used to move an armature. To insure the repeatability of the performance of such valves, it is necessary that the coil produce a constant magnetic flux under all operating conditions such that the electromagnetic force acting upon the armature is constant. Coils, of course, comprise a series of turns of wire and the resistance of this wire will vary depending upon the ambient temperature. Such change in resistance, while determinable, will cause an increase or decrease, as the case may be, in the coil current as function of temperature variation. As is known, the variation in the electromagnetic flux and force applied to the armature various in proportion with the change in current. Prior solenoid valves have attempted to compensate for changes in coil resistivity by way of electronics and more particularly by way of a constant current feedback circuit often located in series with a constrol signal generator and the coil. Those familiar with the state of electromagnetic actuators can appreciate that the cost of such constant current feedback circuitry often increases the cost of the solenoid valve three to four times.

It is an object of the present invention to provide a solenoid valve which produces a substantially constant magnetic field strength. A further object of the present invention is to provide a valve which is self regulating thereby avoiding the need for complicated circuitry as used in the prior art.

Many other objects and purposes of the invention will be clear from the following detailed description of the drawings.

Accordingly, the invention comprises: a solenoid valve comprising: a stator; a coil responsive to current into thereto, for generating a nominal amount of magnetic flux and magnetically connected to the stator. The coil characterized such that its resistance changes with temperature to increase or decrease, as the case may be the amount of flux generated. A valve seat positioned about one end of the stator defining a valve seating surface positioned at a predetermined distance for the one end and a flat armature movable relative to the valve seat and when seated thereon is spaced from the one end. The armature including first means for causing a portion of such armature to move closer to or farther from the one end to vary the distance between such portion on the one end as a function of temperature to compensate for the changes in magnetic flux.

DETAILED DESCRIPTION OF THE DRAWINGS

Figure 1:
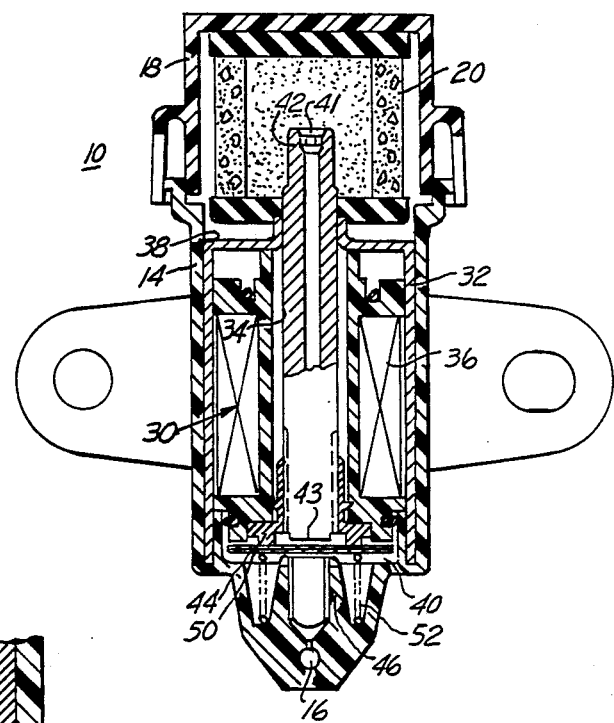
FIG. 1 illustrates a cross-sectional view of an exemplary solenoid valve utilizing the present invention.

FIG. 1 illustrates a solenoid valve 10 modified in accordance with the present invention. More specifically, such valve 10 is an electromagnetic vacuum regulator which generates, at an output port 12, a controlled pressure. The valve 10 comprises a housing 14, the lower part of which forms a vacuum input port 16. The housing further includes a top cap 18 secured thereon in a known manner. Positioned within the top cap is an air filter 20. The air filter illustrated is made from foam. Located within the housing 14 is a coil assembly generally shown as 30. The coil assembly comprises a non-magnetic bobbin 32 having a central opening 34 and an annular shaped coil 36 wound thereon. Extending from the air filter into a pressure chamber 40 formed by the housing and bobbin 32 is a metal stator or pipe 42. Such pipe 42 comprises threads at a lower end thereof onto which is secured a non-magnetic valve seat 44. As is known in the art such valve seat may be fabricated of brass or other non-magnetic materials such as plastic. Further, the stator 42 may be hollow defining a port 41 for communicating air into the chamber, but this is not a requirement of the present invention. Positioned within the chamber and formed as part of the housing is a lower mechanical stop 46 the valve seat 44 functioning as an upper stop. Also positioned within the chamber 40 is a flat disk armature 50. A spring 52 may optionally be included within the valve 10 to urge the disk 50 into closing relation upon the valve seat 44. In addition, the coil assembly 30 may include a ferromagnetic strap 38 which provides a low reluctance path for magnetic flux.

The armature 50 of the present invention is fabricated of a bi-metal, creep type disk. The bi-metal armature is preferably fabricated having at least one of the metals forming the bi-metal as magnetic. Characteristic of these creep type disks is a thermal deflection wherein the center of the bi-metal disk deflects upwardly or downwardly in response to temperature changes above and below a nominal temperature for which the disk is flat. One creep type disk is fabricated by Texas Instruments, Inc. The thermal deflection of the creep type disk is essentially caused by the differing thermal coefficients of expansion of the two metals forming the disk. As an example, the bi-metal disk can be formed of a non-magnetic material such as flush bronze having a high temperature coefficient while the other metal may be magnetic such as Invar or stainless steel having a lower temperature coefficient.

Figure 3:
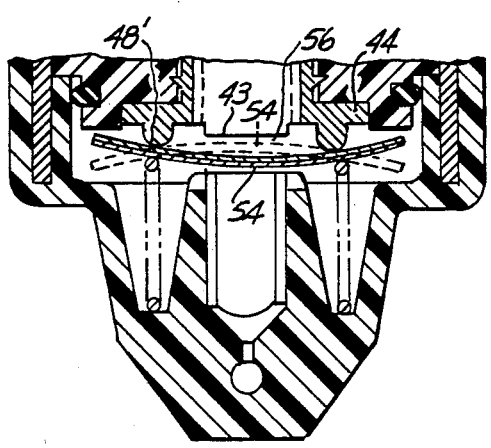
FIG. 3 illustrates an enlarged, partial sectional view of the valve illustrated in FIG. 1.
Figure 2:
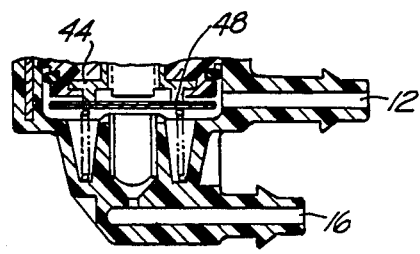
FIG. 2 illustrates a partial cross-sectional view of the valve illustrated in FIG. 1.

Reference is made to FIG. 3 which illustrates the operative state of the armature 50 at two temperature conditions. In the first temperature condition, i.e. above nominal, armature deforms such that its central portion 54 is positioned closer to the end 43 of the stator 42 thereby decreasing the air gap 56 from its nominal dimension and decreasing the reluctance of the magnetic path. The second condition illustrated in FIG. 3 corresponds to a temperature decrease from nominal wherein the disk 50 achieves a curvature such that its central portion 54 is spaced a greater distance from the end of the stator 42 thereby increasing the air gap and reluctance. In addition, FIG. 3 illustrates an alternate embodiment of the valve seat 44. The valve seat 44' of FIG. 3 employs an arcuate preferably spherical seating surface 48' as opposed to the flat seating surface 48 shown in the other FIGURES. It should be appreciated that the valve seat 48' need not be made of metal.

It can be shown that the electromagnetic force acting upon an armature 50 is proportional to magnetic flux which varies with the air gap (reluctance) spacing between the disk 50 and the end of the stator 42. The magnitude of electromagnetic flux generated by the valve 10 is proportional to the magnitude of current input to the coil 36. As the temperature of the coil increases, the resistivity of the wires forming the coil similarly increases which causes a reduction in current flow through the coil. As such, the resultant magnetic force acting upon the armature will decrease, the reverse is true for decreasing temperatures. As mentioned above, constant current feedback electronics have been used to regulate the magnitude of current flowing through such coil in order to compensate for its changes in resistivity. This, however, is not the case in the present invention. Also as mentioned above, the force acting upon the armature 50 is proportional to the air gap 54 between the end of the stator and the armature 50. Because the armature 50, of the present invention is capable of deflecting in response to changes in temperature and thereby varing the reluctance of the magnetic path, i.e. the air gap 56 to maintain the force acting upon the armature substantially constant. As an example, as the temperature increases, the resistivity of the coil reduces and consequently the magnetic flux generated by the coil is reduced. In order to maintain a substantially constant force of attraction upon the armature 50, the armature 50 has deflected upwardly thereby proportionally reducing the air gap to attempt to maintain a constant force of attraction. During situations where the temperature decreases below nominal, the resistivity of the coil 36 will increase thereby increasing the current flow through the coil which would tend to increase the force acting upon the armature 50. This increased current flow, is compensated for since the armature 50 of the present invention, in response to temperature decreases, deflects downwardly thereby increasing the reluctance air gap 54 of the magnetic path.

As can be seen from the above, the armature 50 deflects to vary the reluctance of the magnetic path to reduce variations in the magnetic force of attraction on the armature. While it is desirable to fully self-compensate for these changes, it is not a requirement of the invention. In fact, those familiar with constant current, electronic temperature compensation techniques will appreciate that the electronics used do not fully compensate for changes in current flow due to resistivity variations as a function of temperature. Further, as mentioned above, the armature 50 may be fabricated of a bi-metal. This too, is not a requirement of the invention. It is contemplated that the armature 50 may be fabricated of a plurality of layers consisting of three, four or more different materials fused together to achieve more exacting temperature compensation over a potentially greater temperature range.

Having self-compensated for the effects of varying resistivity, the overall operation of the valve 10 is as follows: A first reference pressure such as atmospheric air is communicated for such as through the center of the stator 42, into the pressure chamber 40. A second reference pressure such as vacuum pressure which may be generated by the intake manifold of an automotive engine, is also communicated to the pressure chamber thereby creating a pressure force differential across the armature 50 tending to urge same downwardly from the valve seat against the force of the spring 52 (if optionally included). In response to a control signal, such as a pulse width modulated current signal input to the coil 36, an electromagnetic force is generated urging the armature back into sealing relation with the valve seat 44. By varying the duty cycle of the control signal, it is possible to controlably blend the source pressures communicated to the chamber 40 as to generate a controlled, blended pressure signal at the output port 12 of the valve 10.

Many changes and modifications in the above described embodiment of the invention can, of course, be carried out without departing from the scope thereof. Accordingly, that scope is intended to be limited only by the scope of the appended claims.

We claim:

1. A solenoid valve comprising:
   a stator;
   a coil responsive to current, magnetically connected to the stator for causing magnetic flux to flow therethrough; wherein the resistance of the coil varies with changes in temperature;
   a valve seat positioned about one end of the stator defining a valve seating surface a predetermined distance from the one end and a flat armature movable relative to the valve seat and when seated thereon is spaced from the one end, the armature including first means for causing a portion of such armature to move closer to or farther from the stator to vary the distance between such portion and the one end as a function of temperature.

2. The device as defined in claim 1 wherein:
   the armature is formed of a thermally responsive element comprising a plurality of fused materials defining a curvature which varies with temperature in a manner to vary the distance between such portion and the one end.

3. The device as defined in claim 2 wherein the armature is a thin plate.

4. The device as defined in claim 3 wherein the armature is a disk.

5. The device as defined in claim 2 wherein at least one of the materials forming the element is ferromagnetic.

6. The device as defined in claim 2 wherein the armature is a bi-metal.

7. The valve as defined in claim 2 wherein the valve seating surface is arcuately shaped.

8. A vacuum control valve comprising:
   a housing, defining a pressure chamber therein, an outlet port extending from the chamber, a vacuum inlet port, and ambient air inlet leading to the chamber;
   a stator including one end extending into the pressure chamber;
   means for communicating air into the chamber;
   a non-magnetic valve seat, located within the chamber and positioned about the one end of the stator, the valve seat including a seating surface extending a predetermined distance beyond the one end of stator;
   a coil, magnetically coupled to the stator, for generating magnetic flux upon excitation, the flux flowing through a magnetic path including the stator;
   means movable within the pressure chamber relative to the seating surface in response to the magnetic flux, for regulating the pressure within the pressure chamber, and comprising temperature compensation means, for varying the effective distance to the one end of the stator as a function of temperature in order to compensate for changes in the magnetic flux due to variations of coil resistivity as a function of temperature.

9. The valve as defined in claim 8 wherein:
the temperature compensation means comprises a bi-metal element which deflects in a manner such that portions thereof are positioned nearer to or further from the one end of the stator thereby changing the reluctance of the magnetic flux path.

10. The valve as defined in claim 9 wherein the bi-metal element is a disk.

11. The valve as defined in claim 10 wherein the center of the disk deflects upwardly in response to increasing temperature.

12. A solenoid valve comprising:
a pressure chamber and a plurality of ports extending into the chamber, two of such ports communicating fluid at dissimilar pressures thereto,
a magnetically responsive, initially flat armature situated within the chamber and movable relative to a motion stop,
means for generating magnetic flux in response to a current signal and for generating a nominal magnetic force of attraction upon the armature when the armature is positioned a nominal determinable distance therefrom, such generating means including a coil wherein the resistivity of same varies in response to the temperature of the coil to increase or decrease the flux as a function of temperature wherein:
the armature comprises means for causing such armature to deflect upwardly and downwardly from its initial condition, in response to changes in temperature, to vary the spacing between a portion of such armature and the generating means in a manner to compensate for the changes in flux due to temperature to maintain the magnetic force of attraction substantially constant.

13. The valve as defined in claim 12 wherein the generating means comprises a ferromagnetic stator magnetically coupled with the coil such that magnetic flux flows therethrough, and defines one end extending into the chamber; and wherein the motion stop comprises a non-magnetic valve seat extending about the one end of the stator such that when the armature is seated thereon, during nominal temperature conditions, the initially flat armature is spaced therefrom by such nominal predetermined distance.

14. The valve as defined in claim 13 wherein such deflecting means includes an element comprising a plurality of fused materials.

15. The valve as defined in claim 14 wherein such deflecting means comprises a bi-metal, thermally responsive element.

16. The valve as defined in claim 13 wherein at least one of the metals forming the element is ferromagnetic.

17. A device comprising:
a stator;
means for generating a current signal;
means, including a coil, for generating magnetic flux through the stator in response to the current signal; wherein the resistance of the coil varies with changes in temperature;
a valve seat positioned about one end of the stator defining a valve seating surface a predetermined distance from the one end and a flat armature movable relative to the valve seat and when seated thereon is spaced from the one end, the armature including first means for causing a portion of such armature to move closer to or farther from the one end as a function of temperature.

18. The device as defined in claim 17 wherein:
the armature is formed of a thermally responsive element comprising a plurality of materials defining a curvature which varies with temperature in a manner to vary the distance between such portion and the one end.

19. The device as defined in claim 18 wherein the armature is a thin plate.

20. The device as defined in claim 19 wherein the armature is a disk.

21. The device as defined in claim 18 wherein at least one of the materials forming the element is ferromagnetic.

22. The device as defined in claim 18 wherein the armature is a bi-metal.

23. The valve as defined in claim 18 wherein the valve seating surface is arcuately shaped.

* * * * *